United States Patent [19]

Berger

[11] Patent Number: 5,476,701

[45] Date of Patent: Dec. 19, 1995

[54] TABLE PAD CONSTRUCTION

[76] Inventor: David Berger, 4833 N. Meridian, Indianapolis, Ind. 46208

[21] Appl. No.: 268,651

[22] Filed: Jun. 28, 1994

Related U.S. Application Data

[63] Continuation of Ser. No. 9,438, Jan. 22, 1993, abandoned, which is a continuation of Ser. No. 631,322, Dec. 20, 1992, abandoned.

[51] Int. Cl.$^6$ ............................................. B32B 3/02
[52] U.S. Cl. ........................... 428/81; D6/613; D6/614; D6/615; D6/616; 428/83; 428/100; 428/125; 428/192; 52/782.22; 52/782.23; 52/796.11
[58] Field of Search ......................... 428/58, 81, 71, 428/76, 45, 100, 125, 44, 192, 83; 248/346.1; 52/802, 782, 783, 784; D6/613, 614, 615, 616

[56] References Cited

U.S. PATENT DOCUMENTS

| | | | |
|---|---|---|---|
| 1,358,508 | 11/1920 | Birdsey | 428/125 |
| 1,583,547 | 5/1926 | Greenberg | 428/125 |
| 1,595,899 | 8/1926 | McDonough | 428/125 |
| 2,167,195 | 7/1939 | Ash | 52/594 |
| 2,663,527 | 12/1953 | Joslyn | 428/192 |
| 2,670,567 | 3/1954 | Meyer | 428/74 |
| 2,805,739 | 9/1957 | Dennison | 52/802 |
| 3,153,817 | 10/1964 | Pease | 52/802 |
| 3,242,509 | 3/1966 | Nissen | 428/100 |
| 3,777,435 | 12/1973 | Perina | 428/100 |
| 3,793,128 | 2/1974 | Chancellor | 428/58 |
| 4,517,232 | 5/1985 | Krauser | 428/58 |
| 4,806,397 | 2/1989 | Horwitz | 428/14 |

*Primary Examiner*—Nasser Ahmad
*Attorney, Agent, or Firm*—Woodard, Emhardt, Naughton Moriarty & McNett

[57] ABSTRACT

An improved table pad which is resistant to deflection and which is more readily produced is disclosed. The table pad is constructed having a solid inner member having a periphery with a groove therein. Covering both surfaces of the inner member are protective layers. A first wearable layer provides a non-scratch surface for contacting the tabletop and a second non-wearable layer provides a durable working surface. The two layers tuck into the groove, thereby providing a smooth covered edge to the table pad methods for making a table pad are also disclosed.

11 Claims, 2 Drawing Sheets

5,476,701

TABLE PAD CONSTRUCTION

This application is a continuation of application No. 08/009,438, filed Jan. 22, 1993, now abandoned, which is a continuation of application No. 07/631,322, filed Dec. 20, 1992, now abandoned.

BACKGROUND OF THE INVENTION

The present invention relates in general to devices for covering and protecting a table or the like, and more specifically to table pads and methods for their production.

Dining room tables and the like are commonly constructed of wood and have finished surfaces which require protection from impact, heat, abrasion and other normal wear and tear. Consequently, pads for covering such tables have long been constructed and used for such protective purposes. For their effective function, such table pads include a covering to contact the table, a covering on the opposite side to provide a working surface or "facing", and an inner member between the coverings to provide a modicum of support.

The covering on the table-contacting side of the pad is made of a wearable material, commonly a felt or a similar soft, fibrous material, either natural or synthetic. The wearable material upon contact with a harder tabletop incurs any wear resulting from the contact and, therefore, does not scratch or mar the finish of the tabletop. The covering on the facing of the table pad is made of a non-wearable, waterproof material, usually a plastic in the current market. The non-wearable material when in contact with cookware, silverware and the like does not incur wear and as a result provides a durable working surface. The predominantly used material and mode of construction for the pad inner member has not changed for many years and consists of a plurality of plies of cardboard-like material such as chipboard or insulating dry felt such is commonly referred to in the roofing industry or similar pliable material. These plies are bonded together by glue or staples or are sewn together along and about one inch from their outer edges or a combination of any of the above. The coverings are then applied with a standard adhesive, and their edges are tucked and securely held in place with the help of the adhesive between adjacent layers of the inner pad construction to provide a smooth, covered edge to the table pad. See, for example, S. Ash, U.S. Pat. No. 2,167,195.

Another table pad construction is suggested by Mortimer R. Meyer, U.S. Pat. No. 2,670,567, which quilts the coverings to an intermediate layer of cotton batting, the batting being sufficiently thick to provide protection against heat.

Table pads constructed as shown in the above-identified Ash patent are flexible and subject to bowing. As a result, it is commonly recommended that these types of table pads be stored in a flat position to retain a flat shape consistent with a tabletop. If bowing does occur the table pad does not rest flush against a tabletop, and with a tablecloth present, the table itself would appear uneven. Excess bowing can also render it difficult to rest stemware, cups etc. filled with liquid without the potentiality of capsizing.

The production of the Ash and Meyer table pads require sewing machines to sew the individual layers together and to provide quilting. Other production techniques employed are stapling and/or gluing the individual layers together or a combination of both. Because the individual layers of material comprising the table pad are thin and pliable, they come in bulk material rolls which must then be cut down into workable sizes.

In light of the problems encountered with these and other types of table pads, there is a need for improved table pads and methods of their construction. The applicant's invention addresses these needs.

SUMMARY OF THE INVENTION

In brief summary, one preferred embodiment of the present invention provides an improvement to a table pad having an inner member, a wearable first layer covering a side of the inner member to provide a non-scratch surface for contact with a tabletop, and a non-wearable second layer covering another side of the inner member to provide a durable working surface. In accordance with the invention, the inner member is solid and comprises a groove in its periphery, and the ends of the two layers are tucked into the groove to provide a covered edge on the table pad.

Another preferred embodiment of this invention relates to a method for making a table pad. This method includes the steps of providing a solid inner member having a groove in its periphery, and covering a surface of the member with a layer of wearable material to provide a non-scratch surface. Also included are steps of covering another surface of the inner member with a layer of non-wearable material to provide a durable working surface, and tucking ends of the layers into the groove to provide a covered edge to the table pad.

Skill another preferred embodiment relates to a table pad apparatus which includes a plurality of table pads in accordance with the first-mentioned embodiment above. A general object of this invention is to provide an improved table pad. A related object is to provide a table pad which is resistant to deflection, thereby providing a table pad which does not require special storage and handling to remain flat. Another related object of this invention is to provide a table pad resistant to deflection, thereby providing a table pad which will lie flat on a tabletop and will not convey an impression of an uneven tabletop when covered by a tablecloth and will not render it difficult to rest filled stemware or cups without capsizing.

Other related objects are to provide a method for making a table pad which does not require sewing, stapling or glueing individual layers together in its manufacture, and which provides an added advantage of having an inner member that can be purchased in usable sizes, thereby providing a more readily manufacturable table pad.

These and further objects and advantages of the present invention will be apparent upon reviewing the following description and appended claims.

DESCRIPTION OF THE PREFERRED EMBODIMENT

Figure 1:
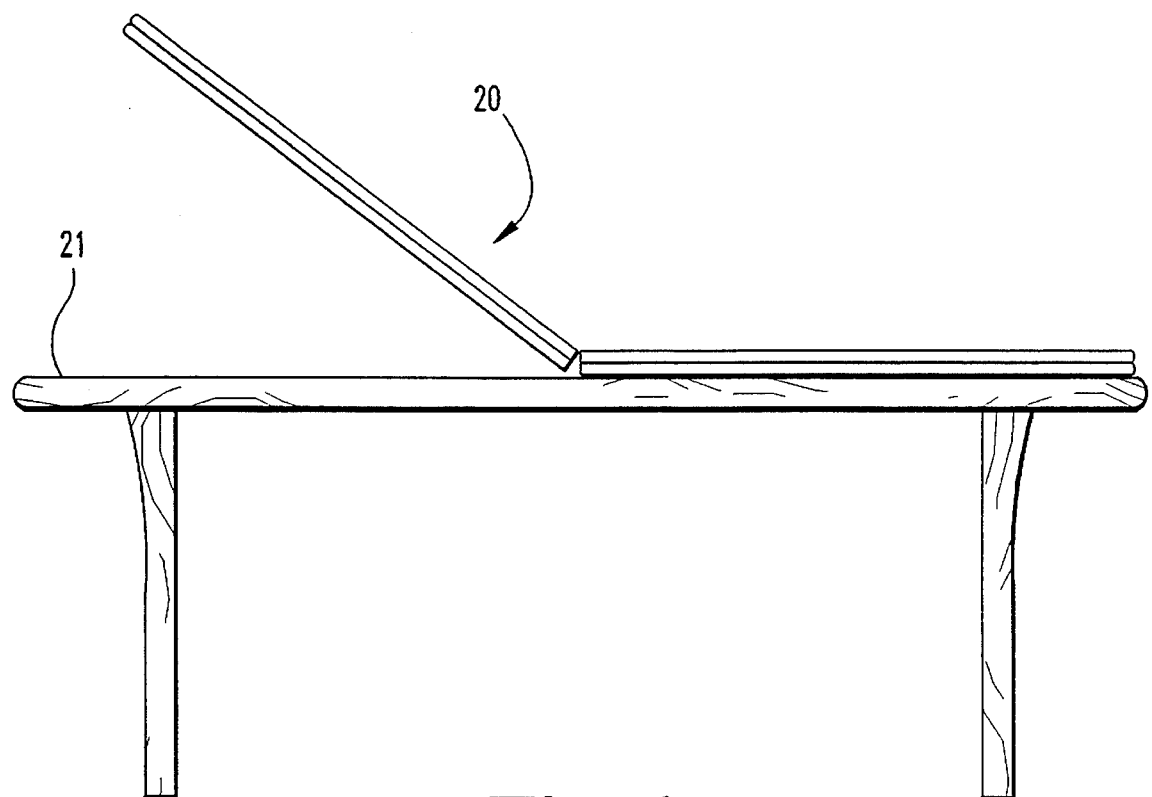
FIG. 1 is an elevational view of a table pad in accordance with the invention in a partial resting position on a table.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and method, and such further applications of the principles of the invention as illustrated therein being contemplated as would normally occur to one skilled in the art to which the invention relates.

Referring now to FIG. 1, a table pad 20 is shown in a partial resting position on a tabletop 21, a portion of table pad 20 resting on tabletop 21 and a portion of table pad 20 in the process of being unfolded to lay flat on tabletop 21. Table pad 20 is preferably foldable to provide for ease of transportation and storage.

Figure 2:
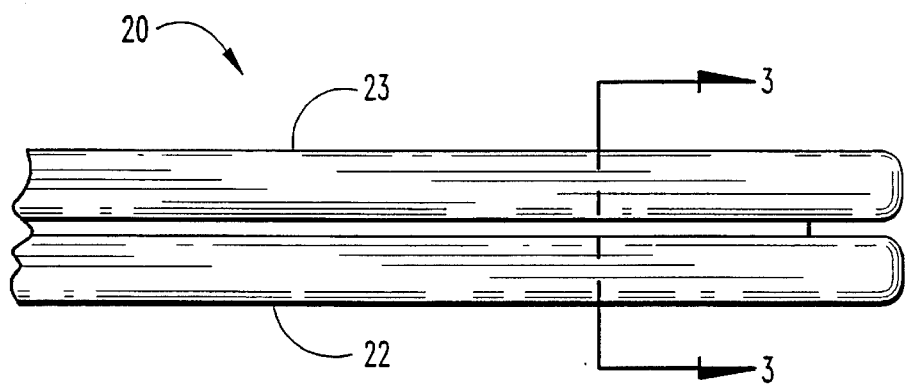
FIG. 2 is an expanded elevational view of an end of the table pad depicted in FIG. 1

Referring now to FIG. 2, an outer end of the same table pad 20 (no longer resting on a table) is individually shown having a wearable first layer 22 and a non-wearable second layer 23. As stated, layer 22 is constructed from a wearable material, commonly a felt or a similar soft, fibrous material which will incur any wear resulting from contact with a tabletop. In the preferred embodiment, soft felt is employed. Layer 23 is fabricated from a non-wearable, waterproof material, and in the preferred embodiment is a simulated wood grain or solid colored vinyl or other plastic sheet like that employed currently in the table pad industry. As a result, layer 23 does not incur wear and provides a durable working surface.

Figure 3:
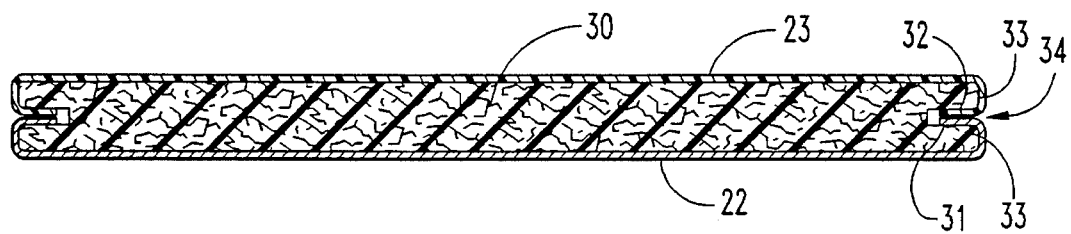
FIG. 3 is a cross sectional view taken along line 3—3 in FIG. 2 and viewed in the direction of the arrows.

Referring now to FIG. 3. Shown is a cross-sectional view taken along line 3—3 of FIG. 2 and viewed in the direction of the arrows. Inner member 30 is shown with layers 22 and 23 covering it. Layer 22 has an end 31 and layer 23 has an end 32. Ends 31 and 32 fold over edge 33 of the inner member and tuck into groove 34 thereby providing a covered edge on table pad 20. Ends 31 and 32 are preferably fastened in groove 34 using standard adhesives.

Figure 4:
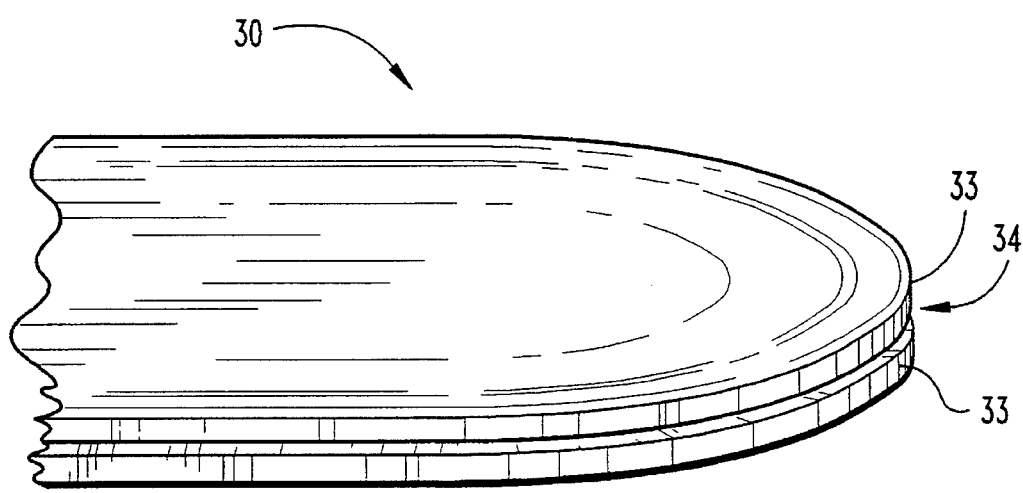
FIG. 4 is a perspective view of an inner member of a table pad in accordance with the invention.

Referring now to FIG. 4, shown is a perspective cutaway view of inner member 30. Inner member 30 is depicted having an edge 33, and groove 34 therein. Inner member 30 provides a supporting structure for layers 22 and 23 (FIG. 3) and also provides the necessary thermal insulation as well as the required resistance to impact damage. Groove 34 is incorporated along edge 33 and in the preferred embodiment groove 34 is incorporated along all outer edges, thus encircling inner member 30 on its outer edges. In this regard, although the preferred embodiment provides a groove in the edge of the inner member, it should be understood that the groove can be located anywhere else near or at the periphery of the inner member.

Figure 5:
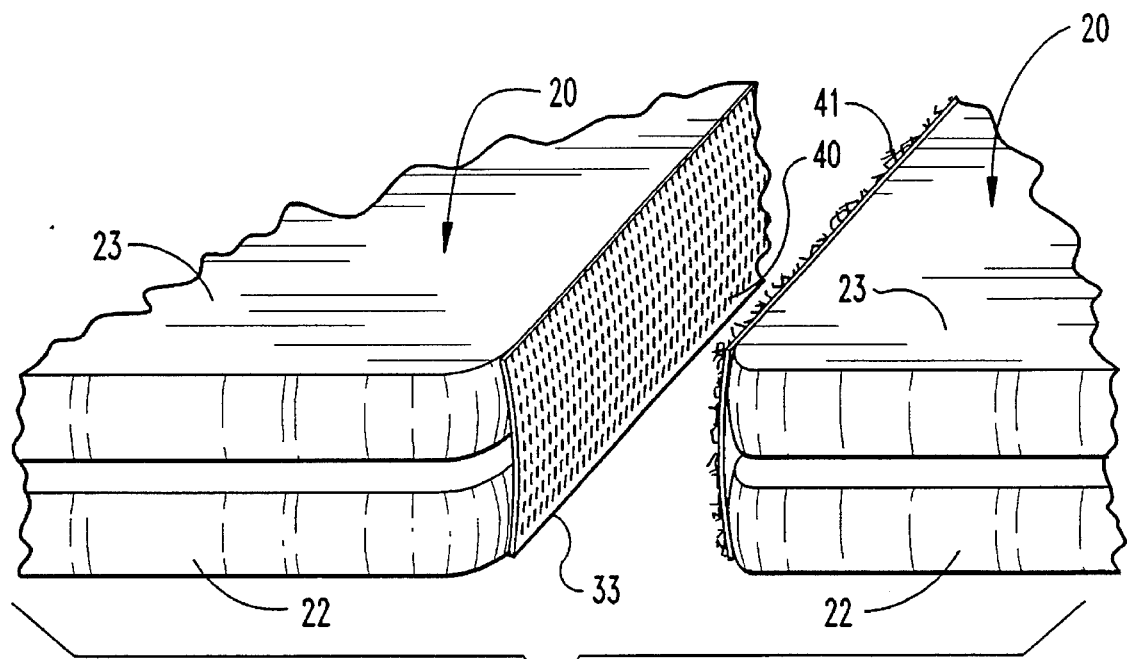

Referring now to FIG. 5, in conjunction with the table pad 20 incorporating inner member 30, a more preferred embodiment also includes an interlocking material 40 such as or similar to VELCRO which is attached to that portion of edge 33 adjacent to another similar table pad having the corresponding VELCRO material 41. In this manner, the pads can be fastened to remain in position on the table top.

Inner member 30 is preferably comprised of a solid material similar to the sheathing used by the construction industry for the outside insulation in homes. This material is a wood fibre board of relatively low density made from pressed sawdust which is coated with either asphalt or waxes to provide a homogeneous solid member. It should be understood that other solid, low density materials can be used as well, such as STYROFOAM, an expanded rigid polystyrene plastic, MASONITE, a fiberboard made from steam exploded wood fiber, and the like. It should also be understood that a homogeneous material provides preferred properties for the inner member in that the material is not predisposed to deflect in either direction such as is the case with the normal layered material such as dry felt or chipboard. The preferred low density nature of the wood fibre board makes for a convenient table pad in that the pad is proportionately lighter and therefore more easily carried.

Because the wood fibre board is used in the construction industry, it comes in workable 4 feet by 8 feet or 4 feet by 9 feet sheets, thus precluding further costly machine operations normally required for reducing current layered inner members to a workable size. In the preferred embodiment this board is about ½ inch thick and is cut out to match the shape of a table top. Although the lateral dimensions of the preferred embodiment are dependent on the shape of a table, the preferred embodiment is less prone to deflections and therefore can be conveniently sized larger than other current industry table pads. The actual dimensions are not limited by storage space considerations for when the table pad is not in use, unlike the current industry table pad which is best stored in a horizontal orientation. Preferably, groove 34 is routed into inner member 30 bisecting edge 32 into two equal thicknesses. In the preferred embodiment, groove 34 is approximately 1/16 inch wide by ½ inch deep and runs the entire circumference of inner member 30. Inner member 30 can be cut to dimension using a common table saw, and groove 26 is preferably cut in a routing process with the width of the groove matching that of the saw blade.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus, comprising:

a foldable table pad for covering the entire upper surface of a table alone or when combined with at least one other table pad, said table pad having a soft felt first layer which provides a non-scratch surface for contacting a table, a second layer of a waterproof plastic sheet which provides a durable working surface, and an inner member between said first and second layers, wherein said inner member is a solid member constructed of wood fiber board made from pressed sawdust coated with asphalt or waxes to provide a homogeneous solid member, said inner member having a side edge with a groove therein, and ends of said first and second layers are tucked into said groove, said table pad being resistant to deflection and remaining flat during storage and use and lying flat on a table top to which said table pad is applied.

2. The table pad of claim 1, wherein said ends of said first and second layers are fastened within said groove with adhesive.

3. The table pad of claim 2 wherein said side edge also includes an interlockable edge so that said table pad can be fastened to a second like table pad.

4. The table pad of claim 3 wherein VELCRO material is fastened to an edge of the pad so that the pad can be fastened to a second like table pad.

5. A table pad apparatus, comprising:

a plurality of foldable table pads that, taken together, cover the entire upper surface of a table, each table pad having a soft felt first layer which provides a non-scratch surface for contacting a tabletop, a second layer of a waterproof plastic sheet which provides a durable working surface, and an inner member between said first and second layers, wherein said inner member is a solid member constructed of wood fiber board made from pressed sawdust coated with asphalt or waxes to provide a homogeneous solid member, said inner member having a side edge with a groove therein, and ends of said first and second layers are tucked into said groove, said table pad being resistant to deflection and remaining flat during storage and use and lying flat on a table top to which said table pad is applied.

6. A table pad apparatus according to claim 5, wherein said layers are fastened in said groove with adhesive.

7. A table pad apparatus according to claim 6, wherein said table pads have VELCRO material provided at their edges so that said pads can be fastened to each other.

8. The apparatus of claim 1 wherein said wood fibre board is about ½ inch thick.

9. The apparatus of claim 5 wherein said wood fibre board is about ½ inch thick.

10. The apparatus of claim 8 wherein said waterproof plastic sheet is vinyl sheet.

11. The apparatus of claim 9 wherein said waterproof plastic sheet is vinyl.

* * * * *

UNITED STATES PATENT AND TRADEMARK OFFICE
CERTIFICATE OF CORRECTION

PATENT NO. : 5,476,701
DATED : December 19, 1995
INVENTOR(S) : David Berger

It is certified that error appears in the above-identified patent and that said Letters Patent is hereby corrected as shown below:

In column 2, line 27, please delete "Skill" and insert in lieu thereof --Still--.

Signed and Sealed this

Thirtieth Day of April, 1996

Attest:

BRUCE LEHMAN

Attesting Officer

Commissioner of Patents and Trademarks